United States Patent
Okano (10) Patent No.: US 10,847,120 B2
(45) Date of Patent: Nov. 24, 2020

(54) CONTROL METHOD AND SYSTEM FOR DISPLAY APPARATUS CONNECTED TO MULTIPLE EXTERNAL APPARATUS

(71) Applicant: SEIKO EPSON CORPORATION, Tokyo (JP)

(72) Inventor: Shuji Okano, Oita (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/356,176

(22) Filed: Mar. 18, 2019

(65) Prior Publication Data

US 2019/0287487 A1 Sep. 19, 2019

(30) Foreign Application Priority Data

Mar. 19, 2018 (JP) .................. 2018-050562

(51) Int. Cl.
*G09G 5/14* (2006.01)
*G09G 5/38* (2006.01)
*G09G 3/00* (2006.01)

(52) U.S. Cl.
CPC .............. *G09G 5/14* (2013.01); *G09G 3/001* (2013.01); *G09G 5/38* (2013.01); *G09G 2354/00* (2013.01); *G09G 2370/16* (2013.01); *G09G 2370/20* (2013.01)

(58) Field of Classification Search
CPC .................. G06F 3/14; G06F 2203/0382–0383
See application file for complete search history.

(56) References Cited

U.S. PATENT DOCUMENTS

| 7,337,225 | B2 * | 2/2008 | Kadota | G06F 3/038 |
| | | | | 709/223 |
| 8,971,809 | B2 * | 3/2015 | Lee | G06F 3/041 |
| | | | | 455/41.2 |
| 9,110,521 | B2 * | 8/2015 | Suzuki | G06F 3/038 |
| 9,916,123 | B2 * | 3/2018 | Natori | H04N 21/4788 |

(Continued)

FOREIGN PATENT DOCUMENTS

| JP | 2002-359878 A | 12/2002 |
| JP | 2009-296404 A | 12/2009 |

(Continued)

*Primary Examiner* — Gene W Lee
(74) *Attorney, Agent, or Firm* — Oliff PLC (57) ABSTRACT

A control method for a display apparatus including an operation receiving section that receives operation, the control method including transmitting a first signal, receiving a second signal transmitted from a first external apparatus that receives the first signal and a third signal transmitted from a second external apparatus that receives the first signal, displaying, when receiving the second signal and the third signal, on a display surface, a first image including information concerning the first external apparatus and information concerning the second external apparatus, executing processing for connection to the first external apparatus when the operation receiving section receives, in a state in which the first image is displayed on the display surface, first operation for selecting the first external apparatus, and displaying a second image corresponding to an image signal transmitted from the first external apparatus after the display apparatus is connected to the first external apparatus.

7 Claims, 8 Drawing Sheets

(56) References Cited

U.S. PATENT DOCUMENTS

| | | | |
|---|---|---|---|
| 10,496,356 B2* | 12/2019 | Yoshida | H04N 21/4108 |
| 2004/0051744 A1 | 3/2004 | Fukui et al. | |
| 2005/0143848 A1 | 6/2005 | Fukui et al. | |
| 2007/0135943 A1 | 6/2007 | Fukui et al. | |
| 2008/0074560 A1* | 3/2008 | Ichieda | H04N 9/3197 |
| | | | 348/739 |
| 2009/0184924 A1* | 7/2009 | Uchida | H04N 5/775 |
| | | | 345/157 |
| 2014/0223380 A1* | 8/2014 | Ikeda | G06F 3/04812 |
| | | | 715/856 |
| 2014/0307282 A1 | 10/2014 | Sato et al. | |
| 2016/0140690 A1* | 5/2016 | Natori | G06F 3/1431 |
| | | | 345/667 |
| 2017/0026617 A1* | 1/2017 | Wang | H04N 21/4524 |
| 2017/0300285 A1* | 10/2017 | Yoshida | G06F 3/1423 |
| 2017/0371426 A1* | 12/2017 | Ano | G06F 3/03542 |

FOREIGN PATENT DOCUMENTS

| | | |
|---|---|---|
| JP | 2014-207532 A | 10/2014 |
| JP | 2016-130878 A | 7/2016 |

\* cited by examiner

CONTROL METHOD AND SYSTEM FOR DISPLAY APPARATUS CONNECTED TO MULTIPLE EXTERNAL APPARATUS

The entire disclosure of Japanese Patent Application No. 2018-050562, filed Mar. 19, 2018, is expressly incorporated by reference herein.

BACKGROUND

1. Technical Field

The present invention relates to a control method for a display apparatus, the display apparatus, and a display system.

2. Related Art

JP-A-2009-296404 (Patent Literature 1) describes a projector including a plurality of input terminals including a wireless LAN (local area network) module. The projector projects and displays, using an image signal received from an external apparatus by the input terminal selected out of the plurality of input terminals, an image corresponding to the image signal on a display surface.

In a display apparatus such as a projector described in Patent Literature 1, when a plurality of external apparatuses connectable to one input terminal could be present, a user sometimes inconveniently needs to specify an external apparatus connectable to the input terminal, operate the external apparatus, and connect the external apparatus to the display apparatus.

SUMMARY

A control method for a display apparatus according to an aspect of the invention is a control method for a display apparatus including an operation receiving section that receives operation, the control method including: transmitting a first signal; receiving a second signal transmitted from a first external apparatus that receives the first signal and a third signal transmitted from a second external apparatus that receives the first signal; displaying, when receiving the second signal and the third signal, on a display surface, a first image including information concerning the first external apparatus and information concerning the second external apparatus; executing processing for connection to the first external apparatus when the operation receiving section receives, in a state in which the first image is displayed on the display surface, first operation for selecting the first external apparatus; and displaying, on the display surface, a second image corresponding to an image signal transmitted from the first external apparatus after the display apparatus is connected to the first external apparatus.

According to this aspect, even if a user does not specify an external apparatus connectable to the display apparatus and operate the external apparatus, the user is capable of displaying an image corresponding to an image signal transmitted from the first external apparatus by operating the display apparatus.

In the control method for the display apparatus according to the aspect, it is desirable that, when the second signal and the third signal are received before a predetermined time elapses after the first signal is transmitted, the first image is displayed on the display surface.

According to the aspect with this configuration, it is possible to display the first image according to a communication state even if the predetermined time is consumed until the second signal and the third signal are received after the first signal is transmitted.

In the control method for the display apparatus according to the aspect, it is desirable that the control method further comprises: executing processing for connection of the first external apparatus and the second external apparatus when the operation receiving section receives, in a state in which the first image is displayed on the display surface, second operation for selecting the first external apparatus and the second external apparatus; and displaying, on the display surface, the second image and a third image corresponding to an image signal transmitted from the second external apparatus after the display apparatus is connected to the second external apparatus.

According to the aspect with this configuration, it is possible to display the first image and the second image while reducing labor and time of the user.

In the control method for the display apparatus according to the aspect, it is preferable that the control method further includes: executing processing for connection of the first external apparatus and the second external apparatus when the operation receiving section receives, in a state in which the first image is displayed on the display surface, third operation for instructing a positional relation between the second image and the third image and the second operation; and displaying, on the display surface, the second image and the third image in the positional relation instructed by the third operation.

According to the aspect with this configuration, it is possible to display the first image and the second image in a positional relation intended by the user while reducing labor and time of the user.

In the control method for the display apparatus according to the aspect, it is desirable that the control method further includes: storing, when the display apparatus is connected to the first external apparatus, a connection history indicating that the display apparatus is connected to the first external apparatus; and executing, when the second signal is received in a state in which the connection history is stored, processing for connection to the first external apparatus without displaying the first image on the display surface.

The display apparatus is often continuously connected to the same external apparatus. According to the aspect with this configuration, for example, it is possible to automatically connect the display apparatus to an external terminal to which the display apparatus is connected last time and reduce labor and time of the user for the connection.

A display apparatus according to another aspect of the invention includes: a display section configured to display an image on a display surface; an operation receiving section configured to receive operation; a transmitting section configured to transmit a first signal; a receiving section configured to receive a second signal transmitted from a first external apparatus that receives the first signal and a third signal transmitted from a second external apparatus that receives the first signal; a first control section configured to cause, when the receiving section receives the second signal and the third signal, the display section to execute a first operation for displaying, on the display surface, a first image including information concerning the first external apparatus and information concerning the second external apparatus; a connection processing section configured to execute, when the operation receiving section receives first operation for selecting the first external apparatus in a state in which the first image is displayed on the display surface, processing for connection to the first external apparatus; and a second control section configured to cause the display apparatus to execute a second operation for displaying, on the display surface, a second image corresponding to an image signal transmitted from the first external apparatus after the display apparatus is connected to the first external apparatus.

According to this aspect, even if the user does not specify an external apparatus connectable to the display apparatus and operate the external apparatus, the user is capable of displaying an image corresponding to an image signal transmitted from the first external apparatus by operating the display apparatus.

A display system according to an aspect of the invention is a display system including a display apparatus, a first external apparatus, and a second external apparatus. The display apparatus includes: a display section configured to display an image on a display surface; an operation receiving section configured to receive operation; a transmitting section configured to transmit a first signal; a receiving section configured to receive a second signal transmitted from a first external apparatus that receives the first signal and a third signal transmitted from a second external apparatus that receives the first signal; a first control section configured to cause, when the receiving section receives the second signal and the third signal, the display section to execute a first operation for displaying, on the display surface, a first image including information concerning the first external apparatus and information concerning the second external apparatus; and a connection processing section configured to execute, when the operation receiving section receives first operation for selecting the first external apparatus in a state in which the first image is displayed on the display surface, processing for connection to the first external apparatus. The first external apparatus includes: a storing section configured to store image data; a communication section configured to communicate with the display apparatus; a determining section configured to determine, when the processing for the connection to the display apparatus is executed, whether a condition for transmitting an image signal corresponding to the image data stored in the storing section to the display apparatus is satisfied; and an operation control section configured to cause the communication section to execute operation for not transmitting the image signal to the display apparatus when the condition is not satisfied and transmitting the image signal to the display apparatus when the condition is satisfied. The display apparatus includes a second control section configured to cause the display section to execute a second operation for displaying, on the display surface, a second image corresponding to an image signal transmitted from the first external apparatus after the display apparatus is connected to the first external apparatus.

According to this aspect, even if the user does not specify an external apparatus connectable to the display apparatus and operate the external apparatus, the user is capable of displaying an image corresponding to an image signal transmitted from the first external apparatus by operating the display apparatus.

The first external apparatus transmits the image signal to the display apparatus when the condition for transmitting the image signal corresponding to the image data stored in the storing section to the display apparatus is satisfied. Therefore, it is possible to prevent an image signal not desired to be transmitted to the display apparatus from being unconditionally transmitted to the display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments are explained below with reference to the drawings. In the embodiments, technically preferred various limitations are added. However, the scope of the invention is not limited to the forms.

First Embodiment

Figure 1:
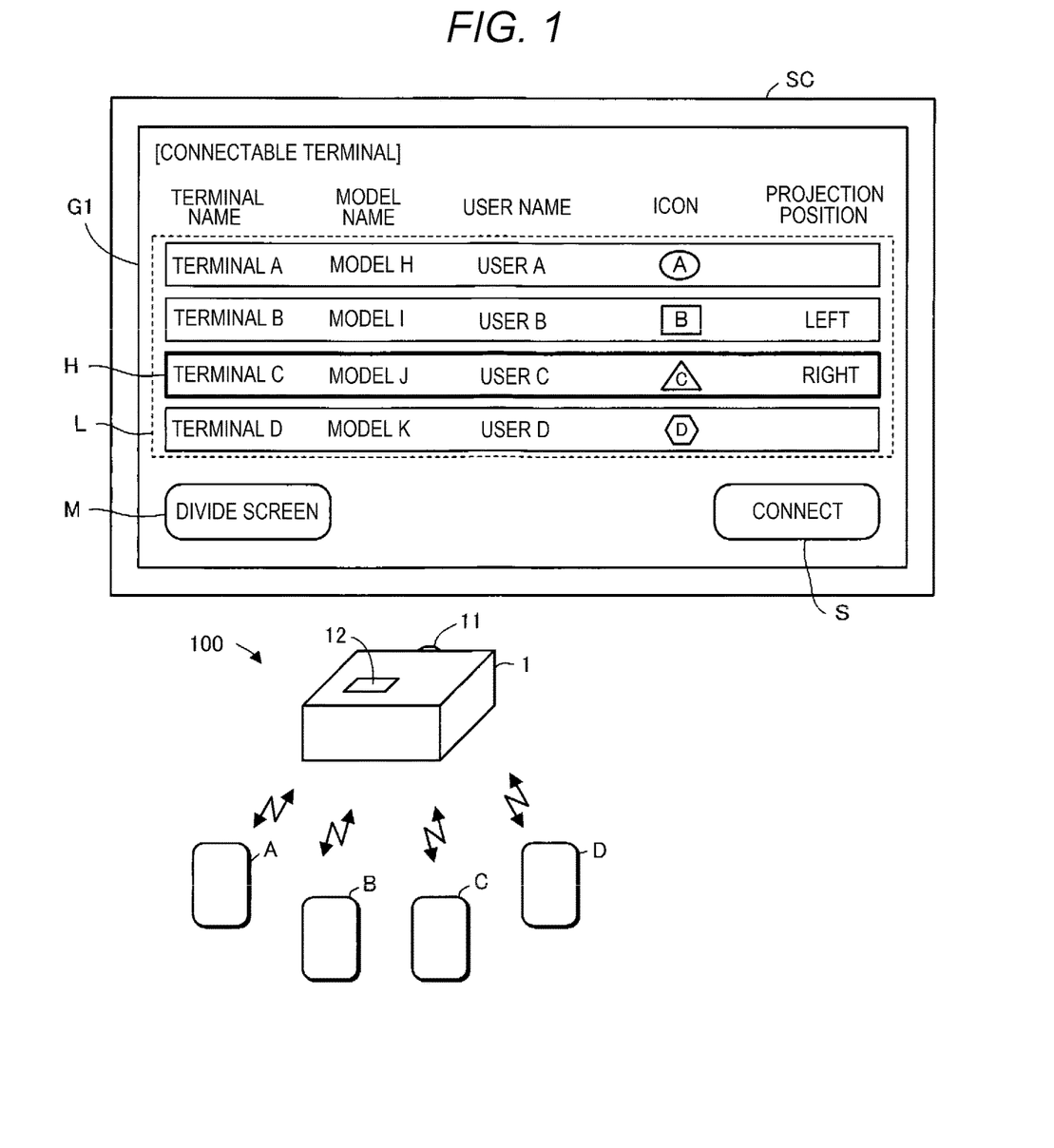
FIG. 1 is a diagram showing a display system according to a first embodiment.

FIG. 1 is a diagram showing a display system 100 according to a first embodiment.

The display system 100 includes a projector 1 and terminals A to D. The projector 1 is an example of a display apparatus. The terminals A to D are examples of external apparatuses. The terminal C is an example of a first external apparatus. The terminal B is an example of a second external apparatus. The respective terminals A to D are capable of transmitting image signals by radio. The respective terminals A to D are, for example, smartphones or PCs (personal computers). The terminals A to D are not limited to the smartphones or the PCs and only have to be electronic apparatuses communicable with the projector 1.

The projector 1 includes a projecting section 11 configured to project an image and a first operation receiving section 12 configured to receive operation. The projector 1 searches for terminals connectable to the projector 1 (hereinafter referred to as "connectable terminals"). In FIG. 1, the respective terminals A to D are the connectable terminals.

The projector 1 projects and displays, on a screen SC, an image (hereinafter referred to as "selection screen") G1 for selecting a terminal connected to the projector 1 (hereinafter referred to as "connection terminal") out of the connectable terminals. The selection screen G1 is an example of the first image. The screen SC is an example of the display surface. The selection screen G1 shows a list L indicating the connectable terminals and a cursor H.

A user of the projector 1 operates the first operation receiving section 12 and moves the cursor H in the selection screen G1. The user of the projector 1 selects connection terminals out of the terminals A to D using the cursor H.

The selection screen G1 shown in FIG. 1 shows a state in which the terminals B and C are selected as connection terminals. Concerning the connection terminals, information indicating projection positions is shown in an item of "projection position". Concerning the terminal B, "left" is shown as the "projection position". Concerning the terminal C, "right" is shown as the "projection position". In this case, an image (hereinafter referred to as "image GB") corresponding to an image signal transmitted from the terminal B is displayed on the left side of an image (hereinafter referred to as "image GC") corresponding to an image signal transmitted from the terminal C. The number of connection terminals is not limited two and only has to be one or more.

When the connection terminals are selected, the projector 1 outputs connection requests to the connection terminals. When receiving the connection requests, the connection terminals determine whether a condition for transmitting an image signal to the projector 1 (hereinafter referred to as "permission condition") is satisfied. The permission condition is, for example, a condition that users of the connection terminals perform, on the connection terminals, approval operation for permitting transmission of the image signal.

When the permission condition is satisfied, the connection terminals are connected to the projector 1. Thereafter, the connection terminals transmit image signals to the projector 1. When receiving the image signals, the projector 1 projects and displays, on the screen SC, images corresponding to the image signals.

In this way, even if the user does not specify terminals connectable to the projector 1, the projector 1 is capable of displaying images corresponding to the image signals transmitted from the connection terminals.

Figure 2:
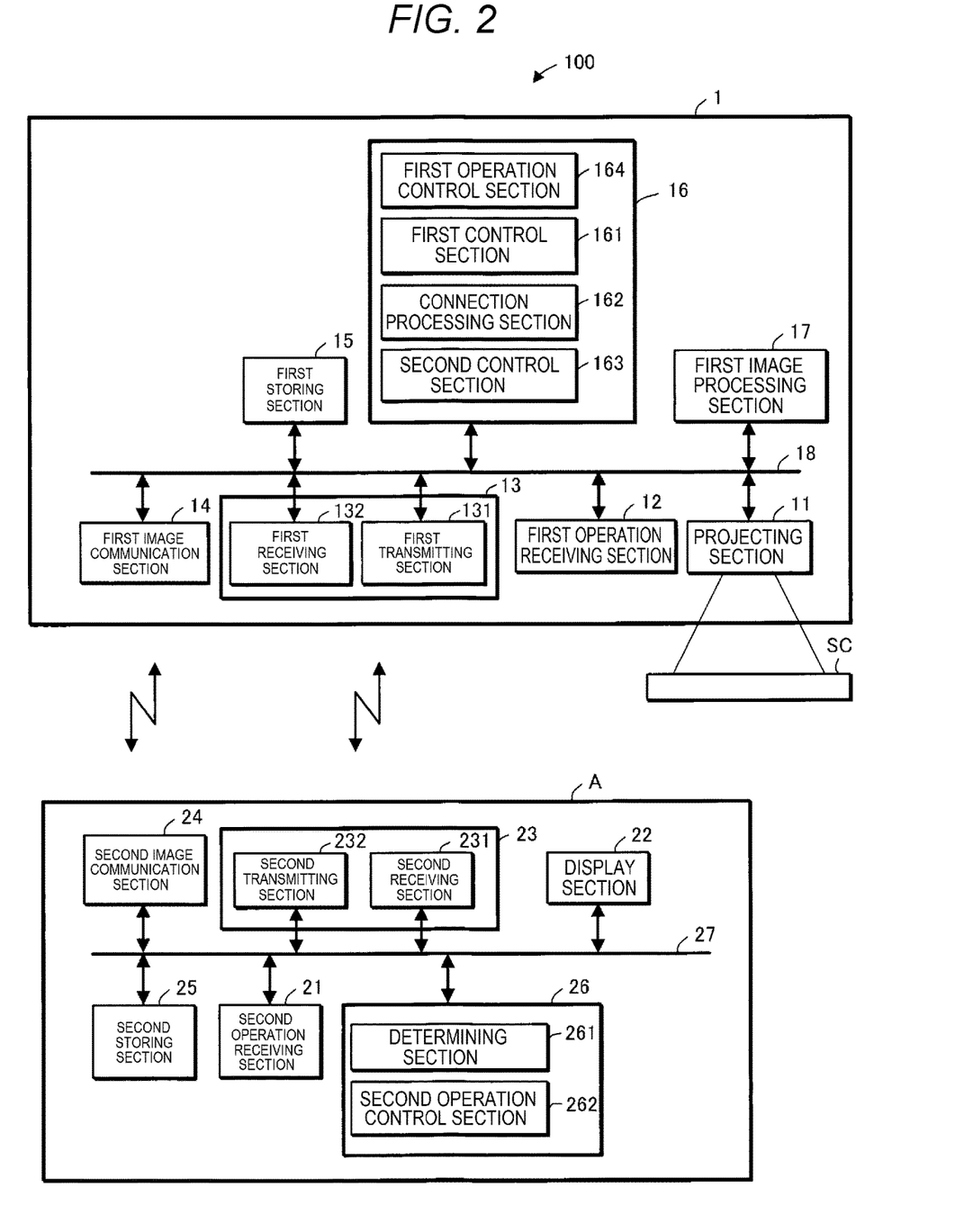
FIG. 2 is a diagram showing a projector and a terminal.

The configurations of the projector 1 and the terminal A are explained. FIG. 2 is a diagram showing the projector 1 and the terminal A. The terminals B to D include the components included in the terminal A. Therefore explanation about the configurations of the terminals B to D is omitted.

First, the projector 1 is explained.

The projector 1 includes the projecting section 11, the first operation receiving section 12, a first communication section 13, a first image communication section 14, a first storing section 15, a first processing section 16, a first image processing section 17, and a bus 18. The projecting section 11, the first operation receiving section 12, the first communication section 13, the first image communication section 14, the first storing section 15, the first processing section 16, and the first image processing section 17 are communicable with one another via the bus 18.

The projecting section 11 is an example of the display section. The projecting section 11 projects and displays an image corresponding to an image signal on the screen SC.

Figure 3:
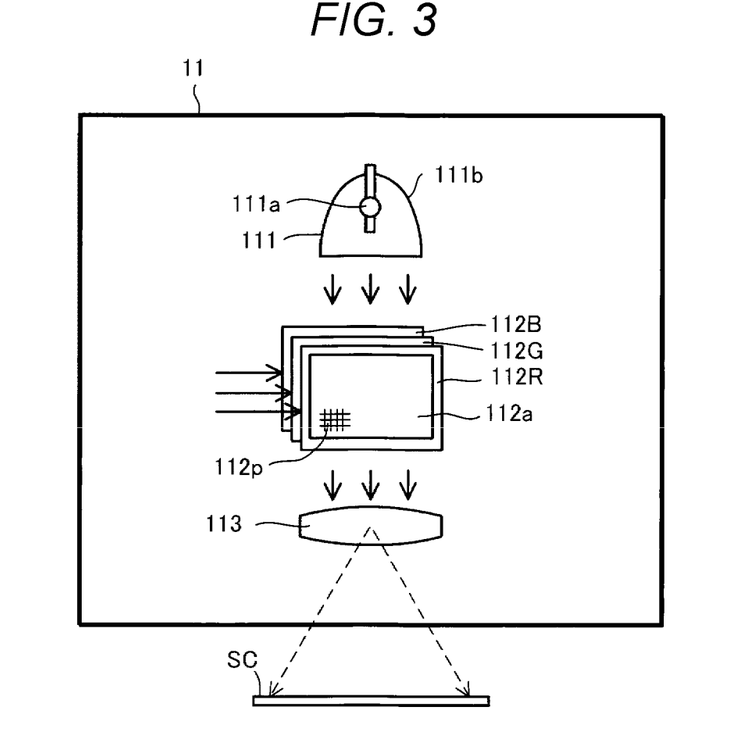
FIG. 3 is a diagram showing an example of a projecting section.

FIG. 3 is a diagram showing an example of the projecting section 11. The projecting section 11 includes a light source 111, three liquid crystal light valves 112R, 112G, and 112B, which are examples of the light modulating device, and a projection lens 113, which is an example of the projection optical system. In the projecting section 11, the liquid crystal light valves 112R, 112G, and 112B modulate light emitted by the light source 111 and generate a projection image (image light). The projection image is enlarged and projected from the projection lens 113.

The light source 111 includes a light source section 111a formed by a xenon lamp, an ultra-high pressure mercury lamp, an LED (Light Emitting Diode), a laser light source or the like and a reflector 111b configured to reduce fluctuation in a direction of the light radiated by the light source section 111a. Fluctuation in a luminance distribution of the light emitted from the light source 111 is reduced by a not-shown integrator optical system. Thereafter, the light is separated into color light components of red, green, and blue, which are the three primary colors of light, by a not-shown color separation optical system. The color light components of red, green, and blue are respectively made incident on the liquid crystal light valves 112R, 112G, and 112B.

The liquid crystal light valves 112R, 112G, and 112B are configured by a liquid crystal panel or the like in which liquid crystal is encapsulated between a pair of transparent substrates. In the liquid crystal light valves 112R, 112G, and 112B, rectangular pixel regions 112a formed by a plurality of pixels 112p arrayed in a matrix shape are formed. In the liquid crystal light valves 112R, 112G, and 112B, a driving voltage corresponding to an image signal can be applied to the liquid crystal for each of the pixels 112p.

When the driving voltage corresponding to the image signal is applied to the pixels 112p, the pixels 112p are set to light transmittance corresponding to the image signal. Therefore, the light emitted from the light source 111 is transmitted through the pixel region 112a to be modulated. A projection image corresponding to the image signal is formed for each of color lights.

The images of the colors are combined for each of the pixels 112p by a not-shown color combination optical system. Projection image light, which is color image light, is generated. The projection image light is enlarged and projected on the screen SC by the projection lens 113.

Referring back to FIG. 2, the first operation receiving section 12 is, for example, various operation buttons, operation keys, or a touch panel. The first operation receiving section 12 receives input operation of the user. The first operation receiving section 12 may be a remote controller or the like that transmits information corresponding to the input operation of the user by radio or wire. In that case, the projector 1 includes a receiving section that receives information transmitted by the remote controller. The remote controller includes various operation buttons, operation keys, or a touch panel that receives the input operation of the user.

The first communication section 13 performs communication for searching for connectable terminals. The first communication section 13 is an interface that performs short range wireless communication such as Bluetooth (registered trademark). The first communication section 13 includes a first transmitting section 131 and a first receiving section 132.

The first transmitting section 131 is an example of a transmitting section. The first transmitting section 131 transmits a search signal for searching for connectable terminals by radio. The search signal is an example of the first signal. A range in which the search signal is transmitted is a communication range of the first transmitting section 131. When an event for transmission for transmitting the search signal occurs, the first transmitting section 131 transmits the search signal by radio.

Examples of the event for transmission include power-on operation in the projector 1, an end of the input of the image signal to the projector 1, and operation for transmitting the search signal. The event for transmission may be other events.

When receiving the search signal, the connectable terminals communicable with the first transmitting section 131 transmit information for connection (hereinafter referred to as "connection information") and information of the terminal (hereinafter referred to as "terminal information") to the first transmitting section 131. In the example shown in FIG. 1, the respective terminals A to D receive the search signal and transmit the connection information and the terminal information to the projector 1. Each of the connection information and the terminal information transmitted from the terminal C that receives the search signal is an example of the second signal. Each of the connection information and the terminal information transmitted from the terminal B that receives the search signal is an example of the third signal.

An example of the connection information is, for example, pairing information in Bluetooth.

An example of the terminal information is information including a terminal name of the connectable terminal, a model name of the connectable terminal, and information concerning a user of the connectable terminal (hereinafter referred to as "user information). The terminal information may be information including any one of the terminal name, the model name, and the user information or may be other information.

The terminal name of the connectable terminal is a name peculiar to the connectable terminal, for example, identification information such as a MAC (Media Access Control) address of the connectable terminal.

An example of the user information of the connectable terminal is information including a name of the user of the connectable terminal and an icon of the user of the connectable terminal. The user information of the connectable terminal may be information including one of the name of the user of the connectable terminal and the icon of the user of the connectable terminal or may be other information.

The first receiving section 132 is an example of the receiving section. The first receiving section 132 receives the connection information and the terminal information transmitted from the connectable terminals.

The first image communication section 14 receives image signals from connection terminals connected to the projector 1. For example, when the terminals B and C are connected to the projector 1, the first image communication section 14 receives an image signal transmitted from the terminal B and an image signal transmitted from the terminal C. The image GB corresponding to the image signal transmitted from the terminal B is an example of the third image. The image GC corresponding to the image signal transmitted from the terminal C is an example of the second image. The first image communication section 14 performs communication of the image signals in, for example, a Miracast system.

The first storing section 15 is a computer-readable recording medium. The first storing section 15 stores computer programs that specify the operation of the projector 1.

The first processing section 16 is a computer such as a CPU (Central Processing Unit). The first processing section 16 may be configured by one or a plurality of processors. The first processing section 16 reads and executes the computer programs stored in the first storing section 15 to thereby realize a first control section 161, a connection processing section 162, a second control section 163, and a first operation control section 164.

The first control section 161 causes the projecting section 11 to execute operation for displaying, on the screen SC, a selection screen corresponding to terminal information received by the first receiving section 132.

For example, when the first receiving section 132 receives the terminal information of the terminal C and the terminal information of the terminal B, the first control section 161 causes the projecting section 11 to execute first operation for projecting, on the screen SC, the selection screen G1 including the terminal information of the terminal C and the terminal information of the terminal B.

The selection screen G1 shown in FIG. 1 is an example of a selection screen displayed on the screen SC when the first receiving section 132 receives terminal information from the respective terminals A to D.

The selection screen G1 shows a screen division button M and a connection button S as well.

The screen division button M is a button for dividing an image projected by the projecting section 11.

The connection button S is a button for instructing connection to the connectable terminals selected on the selection screen G1.

When the first operation receiving section 12 receives selection operation for selecting a connection terminal out of the connectable terminals shown on the selection screen G1, the connection processing section 162 executes processing for connection to the selected connection terminal (hereinafter referred to as "connection processing"). In the connection processing, the connection processing section 162 causes, using connection information of the selected connection terminal, the first transmitting section 131 to execute operation for transmitting a connection request to the connection terminal.

When the first operation receiving section 12 receives first operation for selecting the terminal C in a state in which the selection screen G1 is displayed on the screen SC, the connection processing section 162 transmits a connection request to the terminal C using the first transmitting section 131.

The first operation is, for example, operation in which a not-shown execution button is operated in a state in which the cursor H is located in the terminal C on the selection screen G1 and thereafter the connection button S is pressed.

While the connection processing is executed concerning the terminal C, the selection screen G1 may be displayed or may not be displayed.

When the first operation receiving section 12 receives, in the state in which the selection screen G1 is displayed on the screen SC, second operation for selecting the terminals B and C, the connection processing section 162 transmits a connection request to the terminals B and C using the first transmitting section 131.

The second operation is, for example, operation in which, on the selection screen G1, after the screen division button M is pressed, the not-shown execution button is operated in the state in which the cursor H is located in the terminal C, subsequently, the not-shown execution button is operated in a state in which the cursor H is located in the terminal B, and thereafter the connection button S is pressed.

When the first operation receiving section 12 receives, in the state in which the selection screen G1 is displayed on the screen SC, third operation for instructing a positional state of the image GB and the image GC and the second operation, the connection processing section 162 also transmits a connection request to the terminals B and C using the first transmitting section 131.

The third operation is, for example, operation in which, after the screen division button M is pressed in the second operation, a projection position of the terminal B is set as "left" and a projection position of the terminal C is set as "right". Details of the third operation are explained below.

While the connection processing is executed concerning the terminals B and C, the selection screen G1 may be displayed or may not be displayed.

The second control section 163 causes the projecting section 11 to execute operation for displaying an image corresponding to an image signal on the screen SC.

The second control section 163 causes the projecting section 11 to project, for example, the image GC corresponding to an image signal transmitted from the terminal C after the projector 1 is connected to the terminal C.

The second control section 163 causes the projecting section 11 to execute, for example, operation for displaying the image GC and the image GB on the screen SC in the positional relation instructed by the third operation.

The image signal transmitted from the terminal B and the image signal transmitted from the terminal C are received by the first image communication section 14.

The first operation control section 164 controls the operation of the projector 1. For example, the first operation control section 164 controls the operation of the projector 1 according to operation received by the first operation receiving section 12.

The terminal A is explained. The terminals B to D include the same components as components of the terminal A explained below.

The terminal A includes a second operation receiving section 21, a display section 22, a second communication section 23, a second image communication section 24, a second storing section 25, a second processing section 26, and a bus 27. The second operation receiving section 21, the display section 22, the second communication section 23, the second image communication section 24, the second storing section 25, and the second processing section 26 are communicable with one another via the bus 27.

The second operation receiving section 21 is, for example, various operation buttons, operation keys, or a touch panel. The second operation receiving section 21 receives input operation of the user. The display section 22 is a liquid crystal display that displays various kinds of information.

Like the first communication section 13, the second communication section 23 is an interface that performs short range wireless communication such as Bluetooth. The second communication section 23 includes a second receiving section 231 and a second transmitting section 232.

The second receiving section 231 receives a connection request transmitted from the first transmitting section 131.

The second transmitting section 232 transmits connection information and terminal information of the terminal A to the projector 1. The connection information and the terminal information of the terminal A are stored in the second storing section 25.

The second image communication section 24 is an example of the communication section. The second image communication section 24 transmits an image signal corresponding to image data to the projector 1. The image data is stored in the second storing section 25. The second image communication section 24 performs communication of the image signal in, for example, the Miracast system.

The second storing section 25 is a computer-readable recording medium. The second storing section 25 stores, in addition to a permission condition, connection information, terminal information, and image data, computer programs that specify the operation of the terminal A.

The second processing section 26 is a computer such as a CPU. The second processing section 26 may be configured by one or a plurality of processors. The second processing section 26 reads and executes the computer programs stored in the second storing section 25 to thereby realize a determining section 261 and a second operation control section 262.

When the connection processing of the projector 1 and the terminal A is executed, the determining section 261 determines whether the permission condition is satisfied.

The second operation control section 262 is an example of the operation control section. When the permission condition is not satisfied, the second operation control section 262 does not cause the second image communication section 24 to execute operation for transmitting the image signal corresponding to the image data stored in the second storing section 25 to the projector 1.

On the other hand, when the permission condition is satisfied, the second operation control section 262 causes the second image communication section 24 to execute the operation for transmitting the image signal corresponding to the image data stored in the second storing section 25 to the projector 1.

Operations are explained below.

Figure 4:
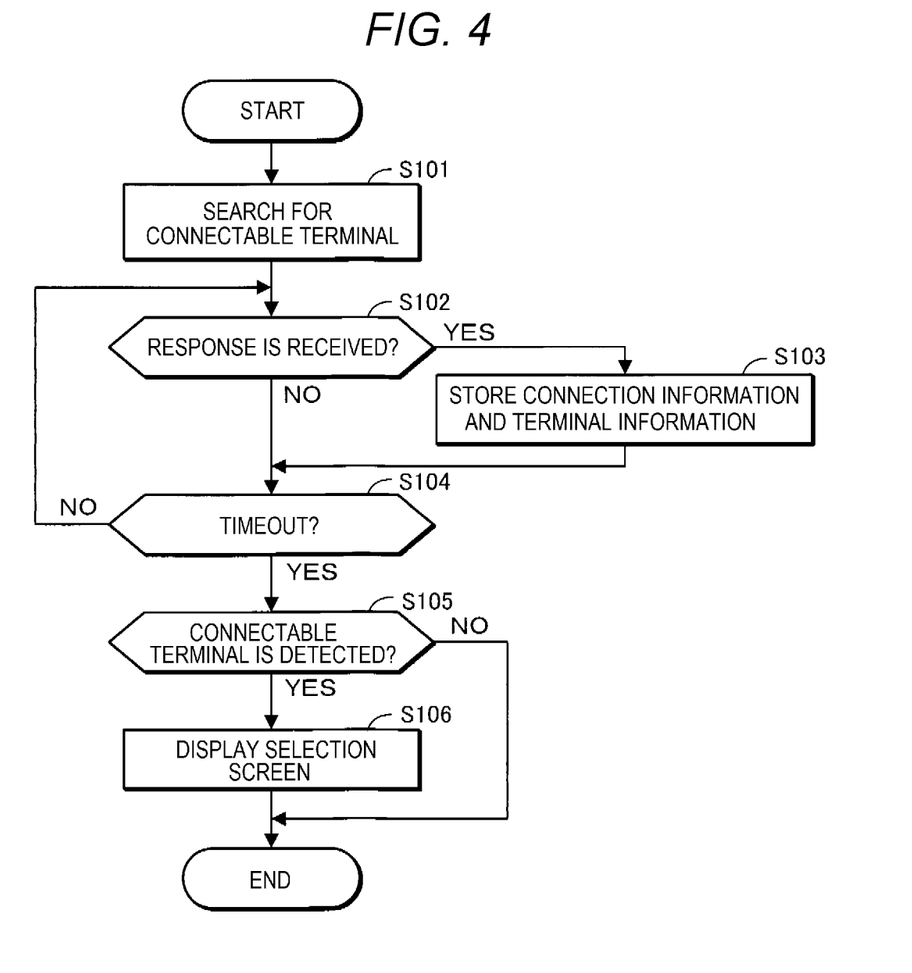
FIG. 4 is a flowchart for explaining operation for displaying a selection screen.

FIG. 4 is a flowchart for explaining operation for displaying a selection screen. In the following explanation, it is assumed that the terminals A to D are present in a range in which a search signal transmitted from the first transmitting section 131 reaches.

When detecting occurrence of an event for transmission, the first operation control section 164 starts searching of a connectable terminal by causing the first transmitting section 131 to transmit a search signal by radio (step S101).

In each of the terminals A to D, when the second receiving section 231 receives the search signal, the second operation control section 262 reads the connection information and the terminal information from the second storing section 25. Subsequently, the second operation control section 262 causes the second transmitting section 232 to execute operation for transmitting the connection information and the terminal information to the projector 1 by radio as a response to the search signal.

The first receiving section 132 of the projector 1 receives the response to the search signal, that is, the connection information and the terminal information (YES in step S102), the first operation control section 164 stores the connection information and the terminal information received by the first receiving section 132 in the first storing section 15 (step S103).

When a response to the search signal is not received in step S102 (NO in step S102), the first operation control section 164 determines whether a fixed time has elapsed after the transmission of the search signal in step S101 and timeout has reached (step S104). The fixed time is an example of the predetermined time. The first operation control section 164 executes step S104 even after step S103 is executed.

When timeout has not reached in step S104 (No in step S104), the processing returns to step S102.

On the other hand, when timeout has reached in step S104 (YES in step S104), the first control section 161 determines whether a connectable terminal is detected (step S105).

In step S105, when the connection information and the terminal information are stored in the first storing section 15, the first control section 161 determines that a connectable terminal is detected. When the connection information and the terminal information are not stored in the first storing section 15, the first control section 161 determines that a connectable terminal is not detected.

When determining in step S105 that a connectable terminal is detected (YES in step S105), the first control section 161 generates an image signal indicating the selection screen G1 using the terminal information stored in the first storing section 15. Subsequently, the first control section 161 causes the projecting section 11 to display the selection screen G1 using the image signal indicating the selection screen G1 (step S106).

Figure 5:
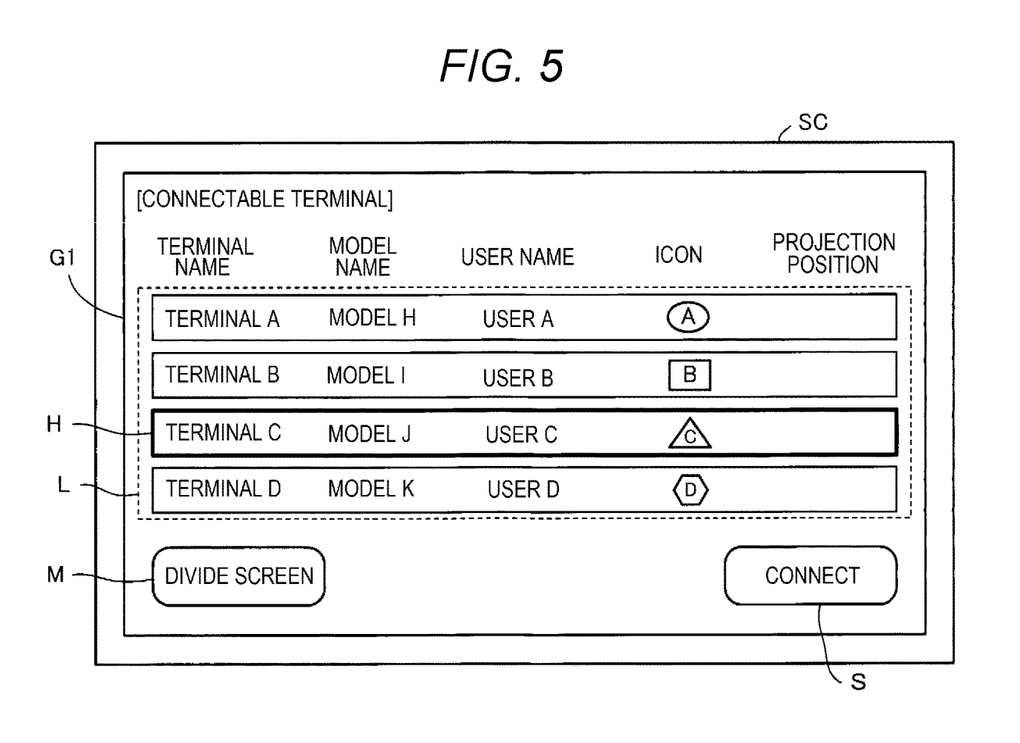
FIG. 5 is a diagram showing an example of the selection screen.

FIG. 5 is a diagram showing an example of the selection screen G1 displayed in step S106. A connection terminal is not selected on the selection screen G1 shown in FIG. 5.

On the other hand, when determining in step S105 that a connectable terminal is not detected (NO in step S105), the first control section 161 ends the operation without causing the projecting section 11 to display the selection screen G1. When determining that the connectable terminal is not detected, the first control section 161 may cause the projecting section 11 to display a selection screen on which no connectable terminal is shown, in other words, a selection screen on which zero connectable terminal is shown.

Operation for selecting a connection terminal using the selection screen G1 is explained.

When the user operates the first operation receiving section 12 to press the screen division button M in a state in which the selection screen G1 shown in FIG. 5 is displayed, the first control section 161 causes the projecting section 11 to execute operation for projecting and displaying, instead of the selection screen G1, on the screen SC, a division setting screen G2 for setting division of a screen.

Figure 6:
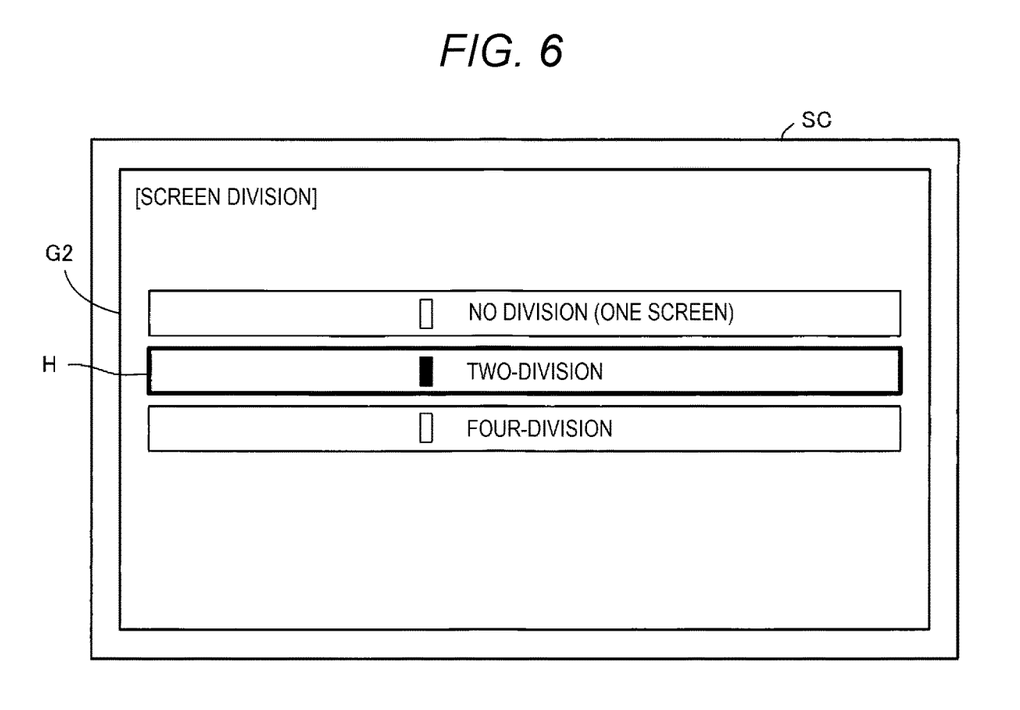
FIG. 6 is a diagram showing an example of a division setting screen.

FIG. 6 is a diagram showing an example of the division setting screen G2. On the division setting screen G2 shown in FIG. 6, "no-division" meaning one screen, "two-division", and "four-division" can be selected. The user operates the first operation receiving section 12 to select any one of the no-division, the two-division, and the four-division. On the division setting screen G2 shown in FIG. 6, the two-division is selected.

When any one of the no-division, the two-division, and the four-division is selected on the division setting screen G2, the first control section 161 causes the projecting section 11 to execute operation for projecting and displaying the selection screen G1 on the screen SC instead of the division setting screen G2.

Subsequently, the user operates the first operation receiving section 12 and selects a connection terminal on the selection screen G1.

Figure 7:
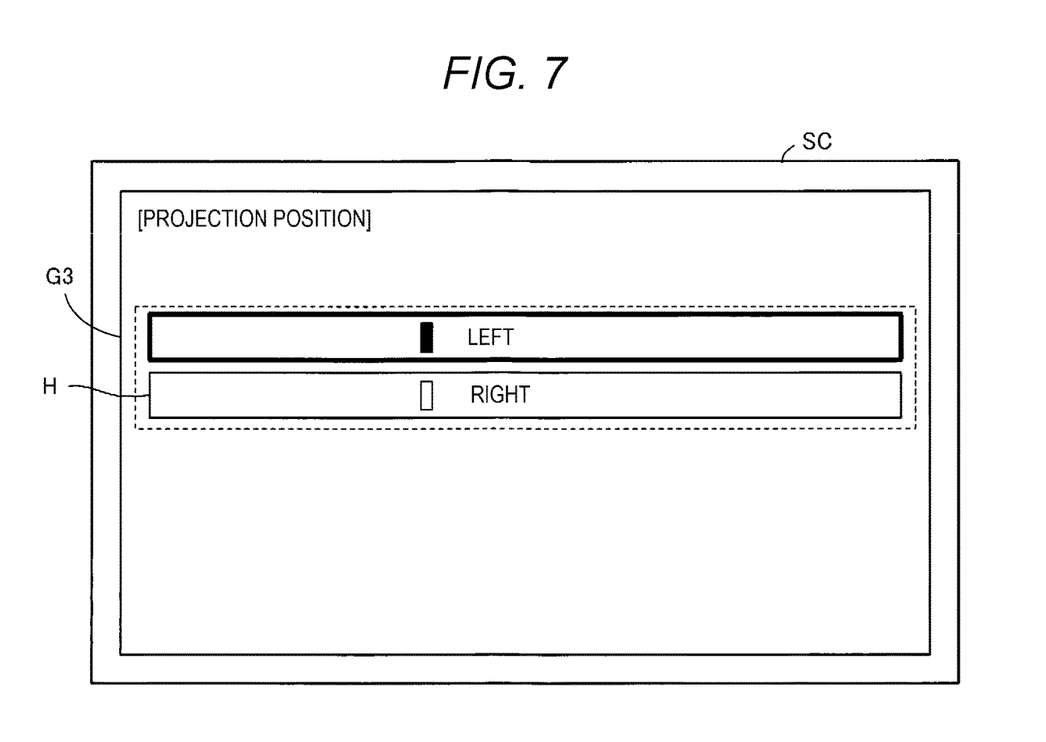
FIG. 7 is a diagram showing an example of a projection position setting screen.

When the connection terminal is selected after the two-division or the four-division is selected, the first control section 161 causes the projecting section 11 to execute operation for projecting and displaying, instead of the selection screen G1, on the screen SC, a projection position setting screen G3 for setting a projection position of an image corresponding to an image signal output by the connection terminal.

FIG. 7 is a diagram showing an example of the projection position setting screen G3. The projection position setting screen G3 shown in FIG. 7 corresponds to the two-division. "Left" or "right" can be set on the projection position setting screen G3 as a projection position. In this case, the user operates the first operation receiving section 12 to select "left" or "right". "Left" is selected on the projection position setting screen G3 shown in FIG. 7.

When "left" or "right" is selected on the projection position setting screen G3, the first control section 161 causes the projecting section 11 to execute operation for projecting and displaying the selection screen G1 on the screen SC instead of the projection position setting screen G3.

Setting concerning the other connection terminals is executed in the same manner.

On the projection position setting screen G3 corresponding to the four-division, for example, any one of "upper left", "upper right", "lower left", and "lower right" can be set.

Operation of connection to connection terminals is explained.

Figure 8:
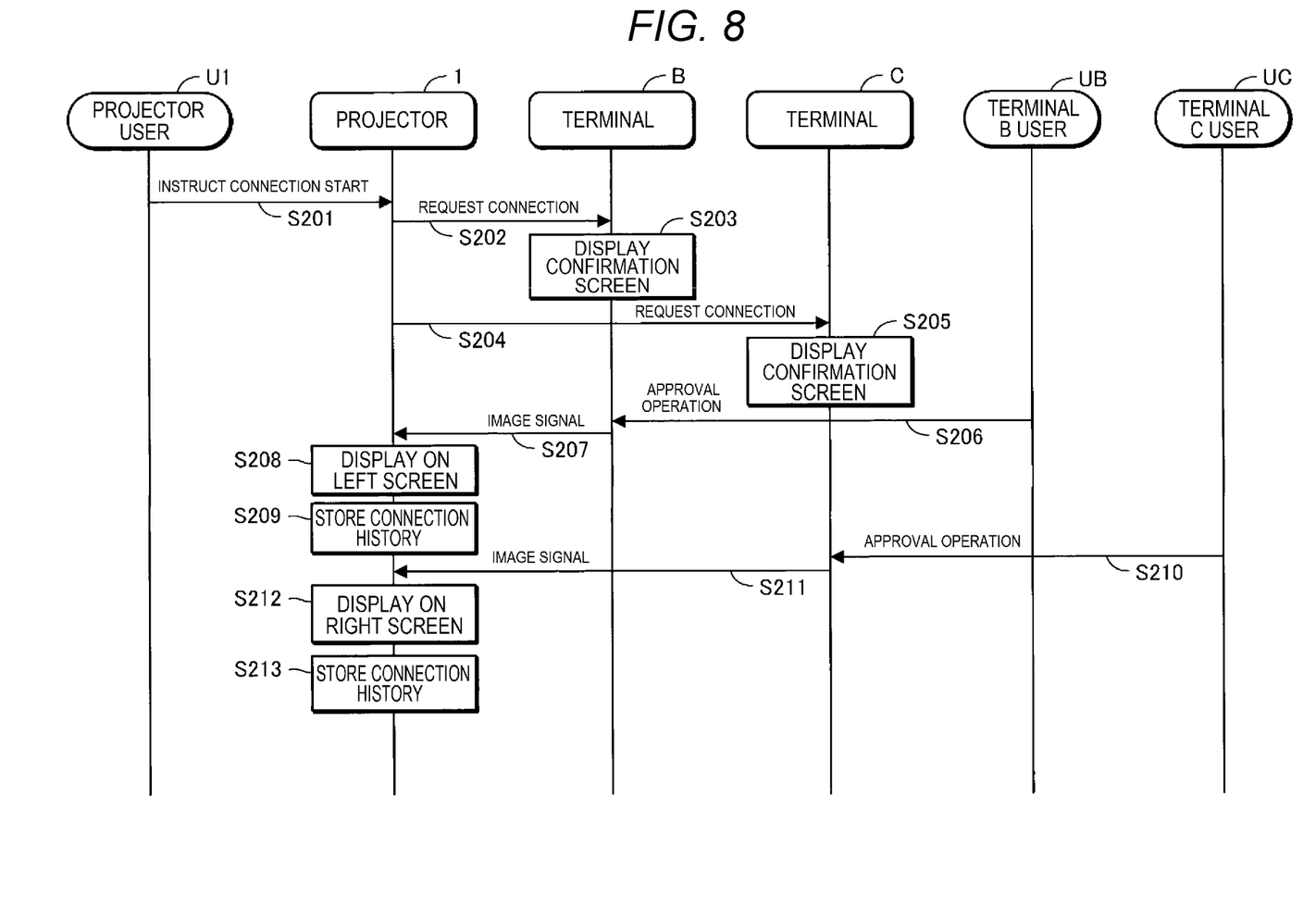
FIG. 8 is a sequence chart for explaining operation of connection to a connection terminal.

FIG. 8 is a sequence chart for explaining the operation of connection to connection terminals. In the following explanation, as shown in FIG. 1, the terminals B and C are respectively set as connection terminals and a two-division screen is set. Setting for displaying the image GB on a left side screen of the two-division screen and displaying the image GC on a right side screen of the two-division screen is performed. The setting of connection terminals and the like can be changed as appropriate.

When the user operates the first operation receiving section 12 after performing the setting of connection terminals and performs a connection start instruction for pressing the connection button S (step S201), the connection processing section 162 causes the first transmitting section 131 to execute operation for transmitting a connection request to the terminal B (step S202).

When the second receiving section 231 receives the connection request, the second operation control section 262 of the terminal B displays a confirmation screen on the display section 22 (step S203).

The confirmation screen is a screen for confirming whether an image signal stored by a connection terminal may be transmitted to the projector 1. The confirmation screen shows an inquiry "permit transmission of an image signal?". The confirmation screen is not limited to the screen showing the inquiry "permit transmission of an image signal?" and can be changed as appropriate.

The connection processing section 162 causes the first transmitting section 131 to execute operation for transmitting a connection request to the terminal C (step S204). When the second receiving section 231 receives the connection request, the second operation control section 262 of the terminal C displays a confirmation screen on the display section 22 (step S205).

When a user of the terminal B operates the second operation receiving section 21 to perform approval operation for approving transmission of an image signal in a state in which the confirmation screen is displayed (step S206), the determining section 261 determines that the permission condition is satisfied. When the permission condition is satisfied, the second operation control section 262 causes the second image communication section 24 to execute operation for transmitting an image signal corresponding to the image data stored in the second storing section 25 to the projector 1 (step S207).

The first image communication section 14 of the projector 1 receives the image signal transmitted from the terminal B. Subsequently, the second control section 163 causes the projecting section 11 to execute operation for projecting, on the left side screen of the divided screen, the image GB corresponding to the image signal received by the first image communication section 14 (step S208).

Subsequently, the second control section 163 stores, in the first storing section 15, a connection history indicating that the terminal B is connected (step S209).

When a user of the terminal C operates the second operation receiving section 21 to perform the approval operation in a state in which the confirmation screen is displayed (step S210), the determining section 261 determines that the permission condition is satisfied. When the permission condition is satisfied, the second operation control section 262 causes the second image communication section 24 to execute operation for transmitting an image signal corresponding to the image data stored in the second storing section 25 to the projector 1 (step S211).

The first image communication section 14 of the projector 1 receives the image signal transmitted from the terminal C. Subsequently, the second control section 163 causes the projecting section 11 to execute operation for projecting, on the right side screen of the divided screen, the image GC corresponding to the image signal received by the first image communication section 14 (step S212).

Subsequently, the second control section 163 stores, in the first storing section 15, a connection history indicating that the terminal C is connected (step S213).

When a connection history is not used, step S209 and step S213 maybe omitted. The first operation control section 164 may delete a connection history when a first time elapses after the connection history is stored in the first storing section 15. When the number of connection histories stored in the first storing section 15 exceeds a predetermined number, the first operation control section 164 may delete the oldest connection history.

With the control method for the projector 1, the projector 1, and the display system 100 according to this embodiment, even if the user does not specify a connectable terminal and operate the external apparatus, the user can operate the projector 1 to display, for example, the image GC corresponding to the image signal transmitted from the terminal C.

When receiving the connection information and the terminal information of the terminal B and the connection information and the terminal information of the terminal C before a fixed time elapses after the search signal is transmitted, the first control section 161 causes the projecting section 11 to execute operation for displaying the selection screen G1 on the screen SC.

Therefore, even if a predetermined time is consumed from the transmission of the search signal until the reception of the connection information and the terminal information of the terminal B and the connection information and the terminal information of the terminal C according to a communication state, it is possible to display the selection screen G1.

When the first operation receiving section 12 receives, in the state in which the selection screen G1 is displayed on the screen SC, the second operation for selecting the terminals B and C, the connection processing section 162 executes processing for connecting the terminals B and C. The second control section 163 causes the projecting section 11 to execute operation for displaying the images GB and GC on the screen SC.

Therefore, it is possible to display the images GB and GC while reducing labor and time of the user.

When the first operation receiving section 12 receives the third operation for instructing a positional relation between the image GB and the image GC and the second operation in the state in which the selection screen G1 is displayed on the screen SC, the connection processing section 162 executes processing for connecting the terminals B and C. The second control section 163 causes the projecting section 11 to execute operation for displaying the images GB and GC on the screen SC in the positional relation instructed by the third operation.

Therefore, it is possible to display the image GB and the image GC in a positional relation intended by the user while reducing labor and time of the user.

The second operation control section 262 causes the second image communication section 24 to execute operation for not transmitting an image signal to the projector 1 when the permission condition is not satisfied and transmitting the image signal to the projector 1 when the permission condition is satisfied.

Therefore, it is possible to prevent an image signal not desired to be transmitted to the projector 1 from being unconditionally transmitted to the projector 1.

Modifications

The invention is not limited to the embodiment explained above. For example, various modifications explained below are possible. A plurality of modifications optionally selected out of forms of the modifications explained below can be combined as appropriate.

Modification 1

The display apparatus such as the projector 1 is often continuously connected to the same external apparatus. Therefore, when the same terminal as a terminal connected last time is present among connectable terminals, the connection processing section 162 prohibits the first control section 161 from displaying the selection screen G1 on the projecting section 11 and executes processing for connecting the projector 1 to the same terminal as the terminal connected last time.

Figure 9:
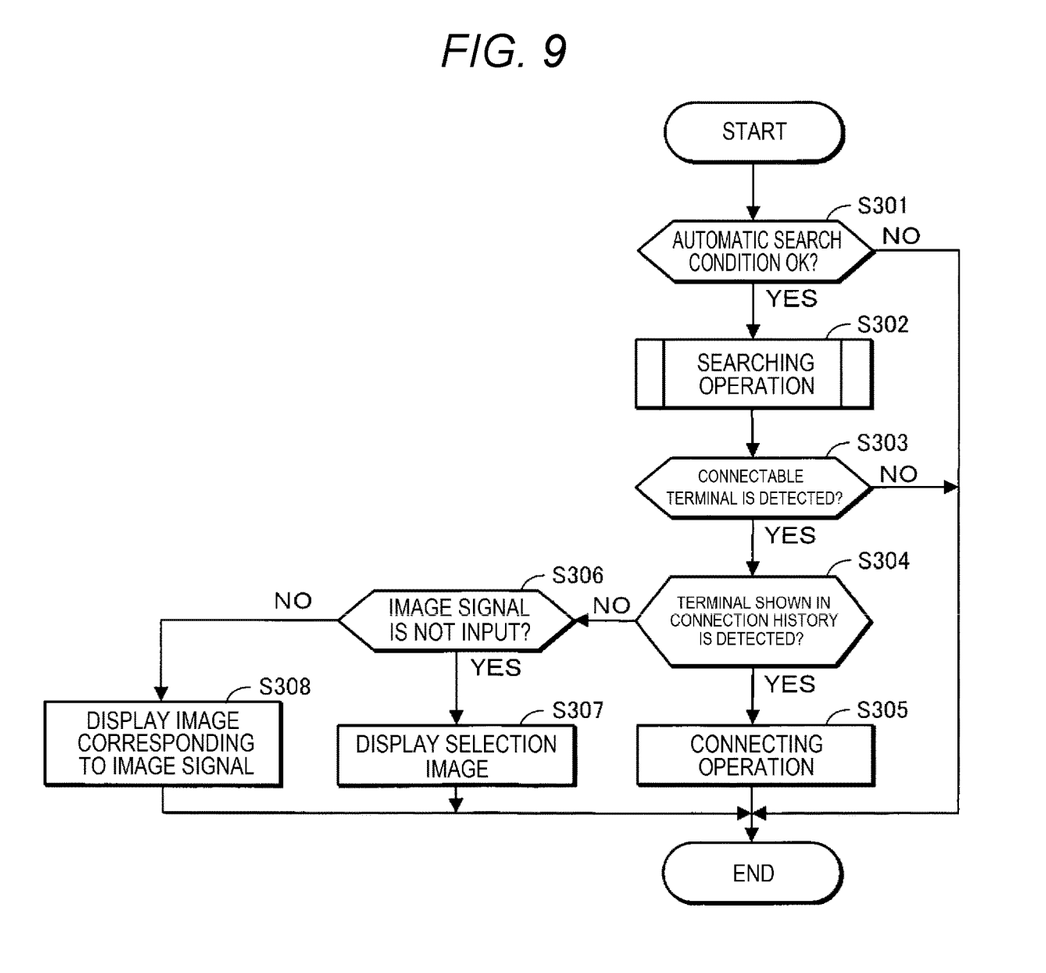
FIG. 9 is a flowchart for explaining operation in a modification 1.

FIG. 9 is a flowchart for explaining operation in the modification 1.

When a power supply of the projector 1 is turned on, the first operation control section 164 determines whether a condition for performing automatic searching of connectable terminals (hereinafter referred to as "automatic searching condition") is satisfied (step S301).

Examples of the automatic searching condition include a specific condition that setting information indicating that the automatic searching is executed is stored in the first storing section 15. The automatic searching condition is not limited to the specific condition and can be changed as appropriate. Examples of the automatic searching condition include a condition based on a state of a radio signal and a condition based on a state of a network to which the projector 1 belongs.

When the automatic searching condition is satisfied (YES in step S301), the first control section 161 executes a searching operation (step S302). Step S302 includes steps S101 to S104 shown in FIG. 4.

When a connectable terminal is detected in the searching operation (YES in step S303), the first operation control section 164 determines, referring to the connection history stored in the first storing section 15, whether the same terminal as a terminal shown in the connection history is detected as the connectable terminal (step S304).

When the same terminal as the terminal shown in the connection history is detected as the connectable terminal (YES in S304), the connection processing section 162 prohibits the first control section 161 from causing the projecting section 11 to display the selection screen G1 and executes processing for connecting the projector 1 to the same terminal as the terminal shown in the connection history (step S305).

For example, when the first receiving section 132 receives the connection information and the terminal information of the terminal C in a state in which the connection history stored in the first storing section 15 indicates connection to the terminal C, the connection processing section 162 does not cause the screen SC to display the selection screen G1 and executes processing for connection to the terminal C.

When the same terminal as the terminal shown in the connection history is not detected as the connectable terminal in step S304 (NO in step S304), the first operation control section 164 determines whether an image signal is not input to the first image communication section 14 (step S306).

When an image signal is not input to the first image communication section 14 (YES in step S306), the first control section 161 causes the projecting section 11 to execute operation for displaying the selection screen G1 on the screen SC (step S307).

When an image signal is input to the first image communication section 14 (NO in step S306), the first operation control section 164 causes the projecting section 11 to execute operation for displaying, on the screen SC, an image corresponding to the image signal input to the first image communication section 14 (step S308).

When the automatic searching condition is not satisfied (NO in step S301) and when a connectable terminal is not detected (NO in step S303), the operation shown in FIG. 9 ends.

According to the modification 1, for example, when the first receiving section 132 receives the connection information and the terminal information of the terminal C in the state in which the connection history stored in the first storing section 15 indicates the connection to the terminal C, the connection processing section 162 executes the processing for connection to the terminal C. Therefore, for example, it is possible to automatically connect the projector 1 to a terminal connected last time. It is possible to reduce labor and time of the user concerning the connection.

Modification 2

The display of the confirmation screen and the approval operation may be omitted.

Modification 3

The communication of the projector 1 and the terminals is not limited to the wireless communication and may be wired communication.

The projector 1 and the terminals use the short range wireless communication for the searching and the connection of connectable terminals and use the wireless LAN communication such as Miracast for the communication of image signals. However, the searching and the connection of connectable terminals and the communication of image signals may be performed by a common communication system, for example, wireless LAN communication.

Modification 4

The terminals A to D may be electronic apparatuses of types same as one another or may be electronic apparatuses of types different from one another. A type of at least one of the terminals A to D may be different from types of the other terminals. The number of terminals is not limited to four and may be two or more.

Modification 5

When the screen division button M is pressed after the connection terminal is selected and the two-division is set on the division setting screen G2, "left" or "right" may be set in default with respect to the selected connection terminals.

Modification 6

All or a part of the respective components of the first processing section 16 and the second processing section 26 may be realized as hardware by an electronic circuit such as an FPGA (field programmable gate array) or an ASIC (Application Specific IC) or may be realized by cooperation of software and hardware.

Modification 7

The liquid crystal light valve is used as the light modulating device. However, the light modulating device is not limited to the liquid crystal light valve and can be changed as appropriate. For example, the light modulating device may a component including three reflection-type liquid crystal panels. The light modulating device may be a component such as a system including one liquid crystal panel, a system including three digital mirror devices (DMDs), or a system including one digital mirror device. When only one liquid crystal panel or DMD is used as the light modulating device, members equivalent to the color separation optical system and the color combination optical system are unnecessary. Besides the liquid crystal panel and the DMD, a component capable of modulating light emitted by the light source 111 can be adopted as the light modulating device.

Modification 8

The projector is used as the display apparatus. However, the display apparatus is not limited to the projector and can be changed as appropriate. For example, the display apparatus may be a display of direct-view type. In this case, a display section of a direct-view type such as a liquid crystal display is used instead of the projecting section 11.

What is claimed is:

1. A control method for a display apparatus that receives operation, the control method comprising:
   transmitting a first signal;
   receiving a second signal transmitted from a first external apparatus that receives the first signal and a third signal transmitted from a second external apparatus that receives the first signal;
   displaying, when receiving the second signal and the third signal, on a display surface, a first image including information concerning the first external apparatus and information concerning the second external apparatus;
   executing processing for connection to the first external apparatus when the display apparatus receives, in a state in which the first image is displayed on the display surface, first operation for selecting the first external apparatus; and
   displaying, on the display surface, a second image corresponding to an image signal transmitted from the first external apparatus after the display apparatus is connected to the first external apparatus.

2. The control method for the display apparatus according to claim 1, wherein, when the second signal and the third signal are received before a predetermined time elapses after the first signal is transmitted, the first image is displayed on the display surface.

3. The control method for the display apparatus according to claim 1, further comprising:
   executing processing for connection of the first external apparatus and the second external apparatus when the display apparatus receives, in a state in which the first image is displayed on the display surface, second operation for selecting the first external apparatus and the second external apparatus; and
   displaying, on the display surface, the second image and a third image corresponding to an image signal transmitted from the second external apparatus after the display apparatus is connected to the second external apparatus.

4. The control method for the display apparatus according to claim 3, further comprising:
   executing processing for connection of the first external apparatus and the second external apparatus when the display apparatus receives, in a state in which the first image is displayed on the display surface, third operation for instructing a positional relation between the second image and the third image and the second operation; and
   displaying, on the display surface, the second image and the third image in the positional relation instructed by the third operation.

5. The control method for the display apparatus according to claim 1, further comprising:
   storing, when the display apparatus is connected to the first external apparatus, a connection history indicating that the display apparatus is connected to the external apparatus; and executing, when the second signal is received in a state in which the connection history is stored, processing for connection to the first external apparatus without displaying the first image on the display surface.

6. A display apparatus comprising:
a display configured to display an image on a display surface;
an operation input receiving interface configured to receive operation;
a transmitting interface configured to transmit a first signal;
a receiving interface configured to receive a second signal transmitted from a first external apparatus that receives the first signal and a third signal transmitted from a second external apparatus that receives the first signal; and
a processor that is configured to function as:
   a first control section that causes, when the receiving interface receives the second signal and the third signal, the display to execute a first operation for displaying, on the display surface, a first image including information concerning the first external apparatus and information concerning the second external apparatus;
   a connection processing section that executes, when the operation input receiving interface receives first operation for selecting the first external apparatus in a state in which the first image is displayed on the display surface, processing for connection to the first external apparatus; and
   a second control section that causes the display apparatus to execute a second operation for displaying, on the display surface, a second image corresponding to an image signal transmitted from the first external apparatus after the display apparatus is connected to the first external apparatus.

7. A display system comprising:
a display apparatus;
a first external apparatus; and
a second external apparatus, wherein
the display apparatus includes:
   a display configured to display an image on a display surface;
   an operation input receiving interface configured to receive operation;
   a transmitting interface configured to transmit a first signal;
   a receiving interface configured to receive a second signal transmitted from a first external apparatus that receives the first signal and a third signal transmitted from a second external apparatus that receives the first signal; and
   a first processor configured to function as:
      a first control section that causes, when the receiving interface receives the second signal and the third signal, the display to execute a first operation for displaying, on the display surface, a first image including information concerning the first external apparatus and information concerning the second external apparatus; and
      a connection processing section that executes, when the operation input receiving interface receives first operation for selecting the first external apparatus in a state in which the first image is displayed on the display surface, processing for connection to the first external apparatus,
the first external apparatus includes:
   a storage configured to store image data;
   a communication interface configured to communicate with the display apparatus; and
   a second processor configured to function as:
      a determining section that determines, when the processing for the connection to the display apparatus is executed, whether a condition for transmitting an image signal corresponding to the image data stored in the storage to the display apparatus is satisfied; and
      an operation control section that causes the communication interface to execute operation for not transmitting the image signal to the display apparatus when the condition is not satisfied and transmitting the image signal to the display apparatus when the condition is satisfied, and
the first processor of the display apparatus also functions as a second control section that causes the display to execute a second operation for displaying, on the second surface, a second image corresponding to an image signal transmitted from the first external apparatus after the display apparatus is connected to the first external apparatus.

* * * * *